US012806100B2

(12) United States Patent
Linde

(10) Patent No.: US 12,806,100 B2
(45) Date of Patent: Nov. 24, 2026

(54) SLING BARS, METHODS FOR ATTACHING A SUBJECT SLING TO SLING BARS, AND LIFT SYSTEMS USING SLING BARS

(71) Applicant: Liko Research & Development AB, Batesville, IN (US)

(72) Inventor: Marcus Linde, Öjebyn (SE)

(73) Assignee: Liko Research & Development AB, Batesville, IN (US)

( * ) Notice: Subject to any disclaimer, the term of this patent is extended or adjusted under 35 U.S.C. 154(b) by 776 days.

(21) Appl. No.: 18/109,610

(22) Filed: Feb. 14, 2023

(65) Prior Publication Data

US 2023/0255845 A1 Aug. 17, 2023

Related U.S. Application Data

(60) Provisional application No. 63/311,256, filed on Feb. 17, 2022.

(51) Int. Cl.
*A61G 7/10* (2006.01)

(52) U.S. Cl.
CPC ......... *A61G 7/1051* (2013.01); *A61G 7/1073* (2013.01)

(58) Field of Classification Search
CPC .. A61G 7/1051; A61G 7/1073; A61G 7/1061; A61G 7/1078; F16M 11/24; F16M 11/04
USPC ............................................................ 5/83.1
See application file for complete search history.

(56) References Cited

U.S. PATENT DOCUMENTS 8,740,492 B2 * 6/2014 Andreasen ............... B66D 3/26 403/353
9,700,474 B2 * 7/2017 Karlsson .................. B66C 1/12
10,925,791 B2 * 2/2021 Chandan .............. A61G 7/1015
2014/0265391 A1 * 9/2014 Karlsson ............. A61G 7/1069 294/81.1

(Continued)

FOREIGN PATENT DOCUMENTS

CN 102238252 A 11/2011
CN 104455132 A 3/2015

(Continued)

OTHER PUBLICATIONS

Extended European Search Report for Application No. 23156702.5-1113 dated Jun. 22, 2023, 9 pages.

(Continued)

*Primary Examiner* — Justin C Mikowski
*Assistant Examiner* — Luke Hall
(74) *Attorney, Agent, or Firm* — Dinsmore & Shohl LLP

(57) ABSTRACT

A sling bar includes a first bar portion, a first receiving aperture, a first strap guide slot, and a first retention spring. The first bar portion has a first upper surface. The first receiving aperture is disposed within the first bar portion. The first strap guide slot is disposed within the first bar portion and extends from the first upper surface to the first receiving aperture. The first strap guide slot is defined by a first lower slot surface and a first upper slot surface. The first retention spring is disposed within the first strap guide slot and moveable between a closed position and an open position. The first retention spring is extended toward the first upper slot surface when in the closed position and is retracted toward the first lower slot surface when in the open position. The first retention spring is biased to the closed position.

20 Claims, 4 Drawing Sheets

(56) References Cited

U.S. PATENT DOCUMENTS

| | | | | |
|---|---|---|---|---|
| 2020/0360212 | A1* | 11/2020 | Chepurny | A61G 7/10 |
| 2021/0154072 | A1* | 5/2021 | Dole | A61G 7/1078 |
| 2021/0316964 | A1* | 10/2021 | Conejo Castaño | A61G 7/1061 |
| 2022/0325848 | A1* | 10/2022 | Degner | F16M 11/2092 |

FOREIGN PATENT DOCUMENTS

| | | | | |
|---|---|---|---|---|
| DE | 10 2004 039 135 | A1 | 2/2006 | |
| DE | 202017005436 | U1 | 11/2017 | |
| EP | 3260725 | A1 * | 6/2016 | F16F 1/18 |

OTHER PUBLICATIONS

Chinese Office Action for Appln. No. 202310127297.7, 11 pages, along with the English Translation 14 pages.

* cited by examiner

SLING BARS, METHODS FOR ATTACHING A SUBJECT SLING TO SLING BARS, AND LIFT SYSTEMS USING SLING BARS

CROSS REFERENCE TO RELATED APPLICATIONS

This application claims priority to U.S. Provisional Application Ser. No. 63/311,256 filed on Feb. 17, 2022, and entitled "Sling Bars, Methods For Attaching a Subject Sling to Sling Bars, and Lift Systems Using Sling Bars," the entirety of which is hereby incorporated by reference.

TECHNICAL FIELD

The present disclosure generally relates to sling bars, and more specifically, to sling bars including sling attachment portions arranged to ensure retention of sling loops associated with a subject sling, as well as methods of operating the sling bars and lift systems incorporating the same.

BACKGROUND

Caregivers often use a lift system to assist with lifting and/or repositioning a subject. The lift system may include a sling bar to facilitate coupling the subject to the lift system via a sling or other support device. Conventional sling bars may require a user, such as a caregiver, to use both hands to attach a sling loop of the sling to the sling bar. For example, the caregiver may have to manipulate a latch of a sling attachment portion of the sling bar with one hand and use their other hand to couple the sling loop to the sling attachment portion of the sling bar. In such instances, simultaneously manipulating the latch of the sling attachment portion while attaching the sling loop may be difficult. In particular, conventional sling bars of this configuration may prevent the caregiver from using one hand to steady or assist the subject while coupling the sling to the sling bar.

Accordingly, sling bars including alternative sling attachment portions that may be manipulated and/or usable with one hand to securely attach sling loops to a sling bar, may be desired.

SUMMARY

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

In a first aspect A1, a sling bar includes a first bar portion, a first receiving aperture, a first strap guide slot, and a first retention spring. The first bar portion extends in a first longitudinal direction and has a first upper surface. The first receiving aperture is disposed within the first bar portion. The first strap guide slot is disposed within the first bar portion and extends from the first upper surface to the first receiving aperture. The first strap guide slot is defined by a first lower slot surface and a first upper slot surface. The first retention spring is disposed within the first strap guide slot and moveable between a closed position and an open position. The first retention spring is extended toward the first upper slot surface when in the closed position and is retracted toward the first lower slot surface when in the open position. The first retention spring is biased to the closed position.

In a second aspect A2 according to the first aspect A1, the first retention spring comprises a first end, a second end, and a middle portion extending between the first end and the second end. The first end and the second end are each disposed within the first lower slot surface, and the middle portion comprises an arcuate shape extending into the first strap guide slot.

In a third aspect A3 according to the second aspect A2, the first lower slot surface comprises a first receiving channel. The first end of the first retention spring is disposed within the first receiving channel.

In a fourth aspect A4, according to the third aspect A3, the first end of the first retention spring is slidable within the first receiving channel, and sliding the first end of the first retention spring within the first receiving channel moves the first retention spring between the open position and the closed position of the first retention spring.

In a fifth aspect A5 according to the third aspect A3 or the fourth aspect A4, the first receiving channel is oriented at an angle to the first lower slot surface.

In a sixth aspect A6 according to the third aspect A3 or the fourth aspect A4, the first receiving channel is oriented substantially parallel to the first lower slot surface.

In a seventh aspect A7 according to any preceding aspect, the first retention spring is a single leaf spring.

In an eight aspect A8 according to any preceding aspect, the first strap guide slot has a top opening and a bottom opening, wherein the top opening is larger than the bottom opening.

In a ninth aspect A9 according to any preceding aspect, at least a portion of the first lower slot surface is oriented at an angle to at least a portion of the first upper slot surface.

In a tenth aspect A10 according to any preceding aspect, the first lower slot surface has a first portion and a second portion oriented at an angle to the first portion.

In an eleventh aspect A11 according to any preceding aspect, the first guide slot has a top opening disposed at the first upper surface, a bottom opening disposed at the first receiving aperture, and a middle portion disposed between the top opening and the bottom opening. The middle portion is wider than the top opening and the bottom opening.

In a twelfth aspect A12 according to any preceding aspect, the first receiving aperture defines an undercut pocket.

In a thirteenth aspect A13 according to any preceding aspect, the sling bar further includes a second bar portion, a second receiving aperture, a second strap guide slot, and second retention spring. The second par portion extends in a second longitudinal direction and has a second upper surface. The second receiving aperture is disposed within the second bar portion. The second strap guide slot is disposed within the second bar portion and extends from the second upper surface to the second receiving aperture. The second strap guide slot is defined by a second lower slot surface and a second upper slot surface. The second retention spring is disposed within the second strap guide slot and is moveable between a closed position of the second retention spring and an open position of the second retention spring. The second retention spring is extended toward the second upper slot surface when in the closed position and is retracted toward the second lower slot surface when in the open position. The second retention spring is biased toward the closed position of the second retention spring.

In a fourteenth aspect A14, a lift system includes a subject lift that includes a sling bar. The sling bar includes a first bar portion, a first receiving aperture, a first strap guide slot, and a first retention spring. The first bar portion extends in a first longitudinal direction and has a first upper surface. The first receiving aperture is disposed within the first bar portion. The first strap guide slot is disposed within the first bar portion and extends from the first upper surface to the first receiving aperture. The first strap guide slot is defined by a first lower slot surface and a first upper slot surface. The first retention spring is disposed within the first strap guide slot and is moveable between a closed position and an open position. The first retention spring is extended toward the first upper slot surface when in the closed position and is retracted toward the first lower slot surface when in the open position. The first retention spring is biased to the closed position.

In a fifteenth aspect A15 according to the fourteenth aspect A14, the first strap guide slot has a top opening and a bottom opening, wherein the top opening is larger than the bottom opening.

In a sixteenth aspect A16 according to the fourteenth aspect A14 or the fifteenth aspect A15, at least a portion of the first lower slot surface is oriented at an angle to at least a portion of the first upper slot surface.

In a seventeenth aspect A17 according to any of the fourteenth through sixteenth aspects A14-A16, the lower slot surface has a first portion and a second portion oriented at an angle to the first portion.

In an eighteenth aspect 18 according to any of the fourteenth through seventeenth aspects A14-A17, the sling bar further includes a second bar portion, a second receiving aperture, a second strap guide slot, and second retention spring. The second par portion extends in a second longitudinal direction and has a second upper surface. The second receiving aperture is disposed within the second bar portion. The second strap guide slot is disposed within the second bar portion and extends from the second upper surface to the second receiving aperture. The second strap guide slot is defined by a second lower slot surface and a second upper slot surface. The second retention spring is disposed within the second strap guide slot and is moveable between a closed position of the second retention spring and an open position of the second retention spring. The second retention spring is extended toward the second upper slot surface when in the closed position and is retracted toward the second lower slot surface when in the open position. The second retention spring is biased toward the closed position of the second retention spring.

In a nineteenth aspect A19, A method of attaching a subject sling to a sling bar includes positioning a sling loop associated with a subject sling into a first strap guide slot on the sling bar; applying a first threshold opening force via the sling loop to a first retention spring disposed within the first strap guide slot, thereby moving the first retention spring from a closed position of the first retention spring to an open position of the first retention spring, wherein the first retention spring is moveable between the closed position of the first retention spring and the open position of the first retention spring and is biased toward the closed position of the first retention spring by a first spring force; and positioning the sling loop in a first receiving aperture disposed within the sling bar and adjoining the first strap guide slot.

In a twentieth aspect A20 according to the nineteenth aspect A19, the method further includes positioning an additional sling loop into a second strap guide slot on the sling bar; applying a second threshold force via the additional sling loop to a second retention spring disposed within the second strap guide slot, thereby moving the second retention spring from a closed position of the second retention spring to an open position of the second retention spring, wherein the second retention spring is moveable between the closed position of the second retention spring and the open position of the second retention spring and is biased toward the closed position of the second retention spring with a second spring force; and positioning the additional sling loop into a second receiving aperture disposed within the sling bar and adjoining the second strap guide slot.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
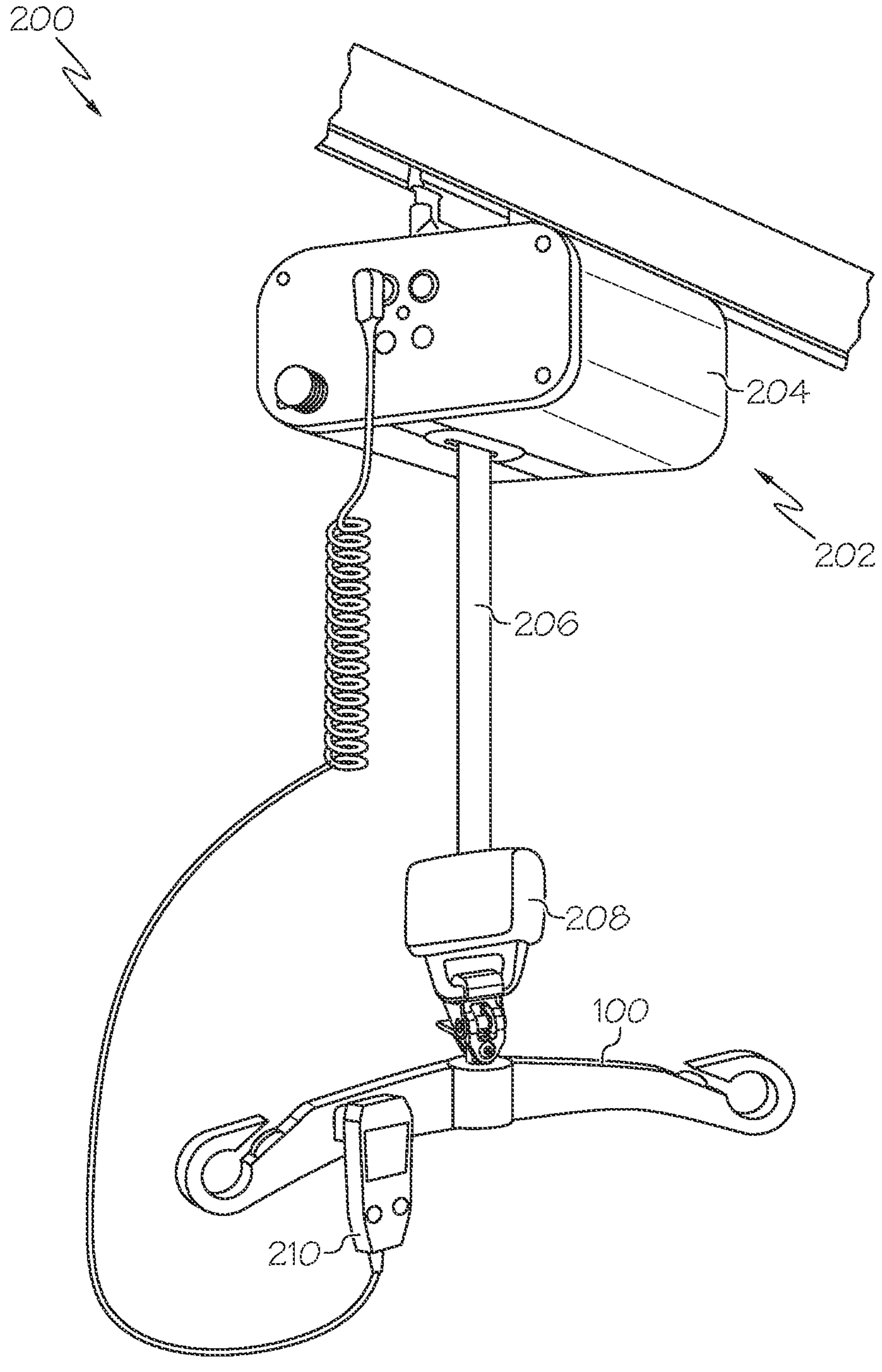
FIG. 1 schematically depicts a perspective view of an illustrative lift system including a sling bar coupled to a subject lift according to one or more aspects shown and described herein.

Reference will now be made in detail to various embodiments of sling bars, lift systems incorporating the sling bars, and methods of using the same, examples of which are illustrated in the accompanying drawings. Whenever possible, the same reference numerals will be used throughout the drawings to refer to the same or like parts. FIG. 1 schematically depicts an illustrative sling bar for use in a subject lift system. In general, the sling bar may include a first bar portion that extends in a first longitudinal direction. The first bar portion may include a first upper surface, a first receiving aperture, a first strap guide slot, and a first retention spring. The first receiving aperture may be disposed within the first bar portion. The first strap guide slot may be disposed within the first bar portion and may extend from the first upper surface to the first receiving aperture. The first strap guide slot may be defined by a first lower slot surface and a first upper slot surface. The first retention spring may be disposed within the first strap guide slot and moveable between a closed position and an open position. The first retention spring may be extended toward the first upper slot surface when in the closed position and may be retracted toward the first lower slot surface when in the open position. The first retention spring may be biased to the closed position. Embodiments of the sling bars described herein, lift systems incorporating the sling bards, and methods of using the same will be described in further detail herein with specific reference to the appended drawings.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, FIG. 1 is a perspective view of an illustrative lift system 200 including the sling bar 100 coupled to a subject lift 202, according to various aspects of the present disclosure. In embodiments, the subject lift 202 may be for example, and without limitation, an overhead lift such as a LikoGuard™ Overhead Lift from Liko AB of Lulea, Sweden, or other similar overhead lifts. The subject lift 202 may include a motor (not depicted) enclosed in a housing 204. The motor may be operatively coupled to a lift strap 206. A sling bar attachment mechanism 208, such as a shackle, may be coupled to a free end the lift strap 206 and the sling bar 100 may be coupled to the sling bar attachment mechanism 208, thereby coupling the sling bar 100 to the lift strap. The motor disposed within housing 204 may wind down (e.g., pay out) the lift strap 206 from the housing 204 to lower the sling bar 100 (e.g., and a subject sling coupled thereto as described herein) and/or wind up (e.g., take up) the lift strap 206 into the housing 204 to raise the sling bar 100 (e.g., and the subject sling coupled thereto as described herein). A lift control device 210 may be communicatively coupled (e.g., wired or wirelessly) to the motor disposed in the housing 204 to control operation of the subject lift 202. The subject lift 202 may be utilized to aid a caregiver in lifting a subject (i.e., a patient) and/or repositioning a subject. Additionally or alternatively, the subject lift 202 may be utilized to support a subject during ambulation.

While FIG. 1 schematically depicts the lift system 200 as an overhead lift, it should be understood that the sling bars 100 described herein may be used in conjunction with other types of lift systems. For example and without limitation, the sling bars described herein may be used in conjunction with mobile lifts, such as the Viking™ series of mobile lifts from Liko AB of Lulea, Sweden, or other similar mobile lifts.

As noted herein, conventional sling bars (not depicted) may include a sling attachment portion that includes a latch or gate that must be actively manipulated to an open position to facilitated inserting a sling loop of a sling or other support device into the sling attachment portion. The process of manipulating the latch and inserting the sling loop may be a two-handed operation such that the caregiver is unable to use one hand to steady the subject in the sling or support device. Further, the operation of the latches or gates of conventional sling bars may create pinch points in which the sling loop may become entangled or ensnared, requiring that the sling loop be adjusted or reset in the sling attachment portion of the sling bar. Adjusting or resetting the sling loop may further complicate and/or protract the process of attaching the sling loop to the sling attachment portion of the sling bar.

The embodiments of the sling bars described herein mitigate these issues with conventional sling bars by utilizing a strap guide slot to guide the sling loop into the sling attachment portion of the sling bar in combination with a retention spring to passively retain the sling loop in the sling attachment portion of the sling bar.

Figure 2:
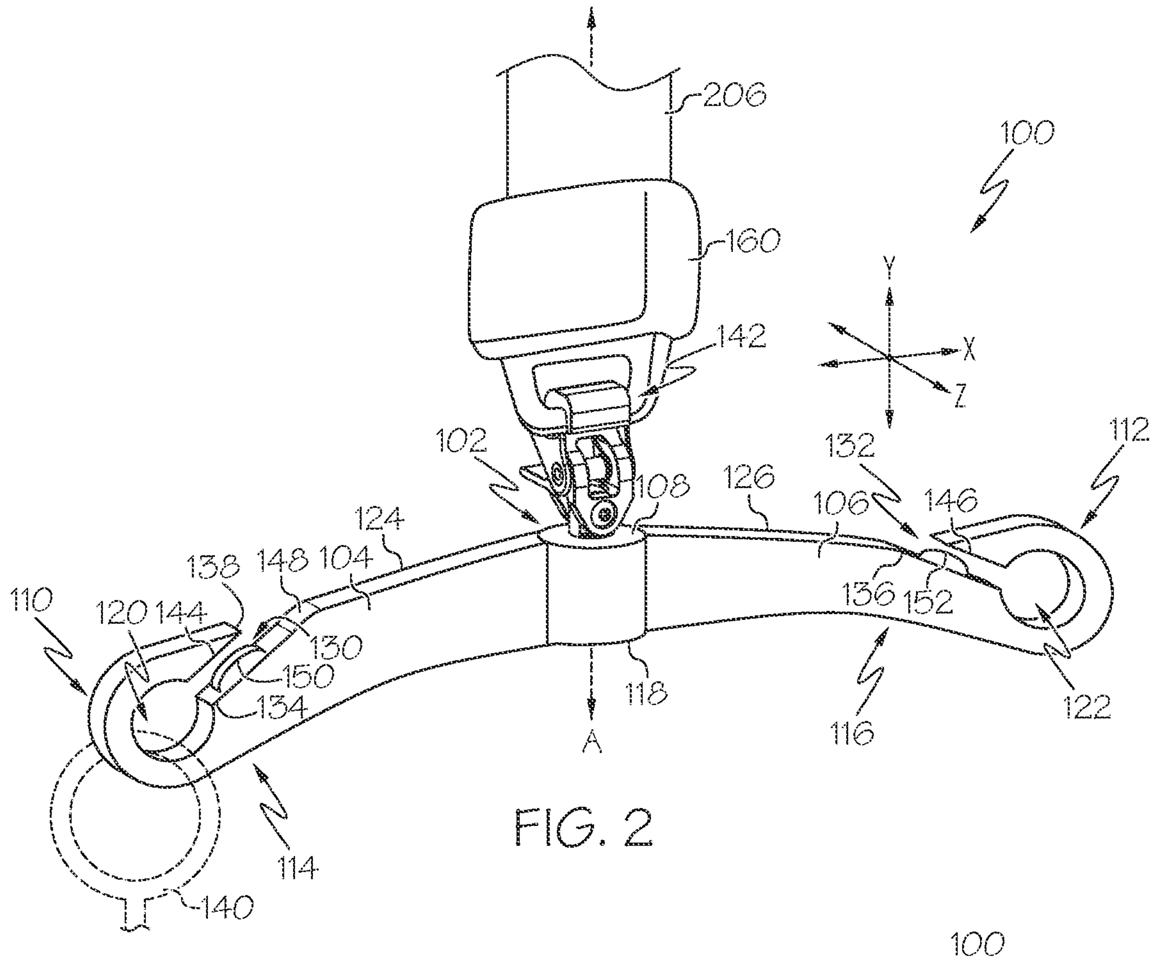
FIG. 2 schematically depicts a perspective view of the sling bar of FIG. 1, according to one or more embodiments shown and described herein.

Referring now to FIG. 2, FIG. 2 depicts a perspective view of the illustrative sling bar 100 including sling attachment portions 110, 112 at opposite ends of the sling bar 100, according to one or more embodiments of the present disclosure. As depicted in FIG. 2, the sling bar 100 may include a hub portion 102, a first bar portion 104, and a second bar portion 106. In embodiments, the hub portion 102 may be disposed concentrically about a first axis (e.g. axis A, as depicted in FIG. 2). In embodiments, the hub portion 102 may be generally cylindrically shaped and may extend about the first axis (e.g. axis A) between a top surface 108 (e.g. in the +Y direction of the coordinate axis of FIG. 2) and a bottom surface 118 (e.g. in the −Y direction of the coordinate axes of FIG. 2). As depicted in FIG. 2, an attachment hook 142 may be coupled to the sling bar 100 at or near the top surface 108. The attachment hook 142 may be pivotally coupled to the hub portion 102 such that it is rotatable about the axis A. The attachment hook 142 may be configured to attach the sling bar 100 to an overhead device (not depicted). For example and without limitation, the attachment hook 142 may be configured to attach the sling bar 100 to a shackle 160 a fixed to the end of a lift strap 206.

The first bar portion 104 may extend from the hub portion 102 in a first longitudinal direction (e.g., in the −X direction of the coordinate axes of FIG. 2) toward a first end 114 of the sling bar 100, and the second bar portion 106 may extend from the hub portion 102 in a second longitudinal direction (e.g., in the +X direction of the coordinate axes of FIG. 2) toward a second end 116 of the sling bar 100. The first bar portion 104 comprises a first upper surface 124, and the second bar portion 106 comprises a second upper surface 126. The first upper surface 124 may extend from the hub portion 102 at a location at or near the top surface 108 of the hub portion 102 in the first longitudinal direction (e.g., in the −X direction of the coordinate axes of FIG. 2) toward the first end 114. The second upper surface 126 may extend from the hub portion 102 at a location at or near the top surface 108 of the hub portion 102 in the second longitudinal direction (e.g., in the +X direction of the coordinate axes of FIG. 2) toward the second end 116.

Referring still to FIG. 2, the sling bar 100 may further include a first sling attachment portion 110 positioned at the first end 114 of the first bar portion 104 and a second sling attachment portion 112 positioned at or near the second end 116 of the second bar portion 106. Each of the first sling attachment portion 110 and second attachment portion 112 may have a hook shape in vertical cross section such that each of the first sling attachment portion 110 and the second sling attachment portion 112 may be utilized to selectively couple a sling loop 140 of a subject sling to the sling bar 100, as described herein. In particular, each of the first sling attachment portion 110 and the second sling attachment portion 112 may be sized and/or dimensioned to couple to one or more than one sling loop (e.g., sling loop 140 depicted in phantom in FIG. 2) of a subject sling as described more fully herein.

In particular and as depicted in FIG. 2, the first sling attachment portion 110 may extend from the first bar portion 104 (e.g., at or near the first end 114) in generally the first longitudinal direction (e.g., in the −X direction of the coordinate axes of FIG. 2) a first predetermined distance, extend (e.g., hook upward) in generally the first vertical direction (e.g., in the +Y direction of the coordinate axes of FIG. 2) a second predetermined distance, and extend back (e.g., hook back) in generally the second longitudinal direction (e.g., in the +X direction of the coordinate axes of FIG. 2) toward the first bar portion 104 a third predetermined distance to define a first receiving aperture 120 at or near the first end 114 of the first bar portion 104.

Similarly, the second sling attachment portion 112 may extend from the second bar portion 106 (e.g., at or near the second end 116) in generally the second longitudinal direction (e.g., in the +X direction of the coordinate axes of FIG. 2) the first predetermined distance, extend (e.g., hook upward) in generally the first vertical direction (e.g., in the +Y direction of the coordinate axes of FIG. 2) the second predetermined distance, and extend back (e.g., hook back) in generally the first longitudinal direction (e.g., in the −X direction of the coordinate axes of FIG. 2) toward the second bar portion 106 the third predetermined distance to define a second receiving aperture 122 at or near the second end 116 of the second bar portion 106.

As described herein, in embodiments, each of the first sling attachment portion 110 and the second sling attachment portion 112 may be sized and/or dimensioned to receive one or more than one sling loop (e.g., sling loop 140 depicted in phantom in FIG. 2). Accordingly, the first predetermined distance, the second predetermined distance, and/or the third predetermined distance may be based on various parameters (e.g., thickness, width, elasticity, and/or the like) of one or more than one sling loop 140. Accordingly, a plurality of sling bars 100 may be manufactured to include a first sling attachment portion 110 and a second sling attachment portion 112, where each sling bar 100 has a different first, second and/or third predetermined distance to accommodate sling loops 140 of different sizes, different numbers of sling loops 140, and the like. According to various aspects, the first, second, and/or third predetermined distance may be based on a combination of parameters associated with one or more than one sling loop that may be coupled to the first sling attachment portion 110 and the second sling attachment portion 112. Furthermore, the plurality of sling bars 100 may be manufactured such that each sling bar 100 has a different overall length. Here, each overall length may be based on a combination of parameters associated with a subject sling or other support device that may be coupled to each sling bar.

Still referring to FIG. 2, the sling bar 100 comprises a first strap guide slot 130 positioned at or near the first end 114 of the first bar portion 104 and a second strap guide slot 132 positioned at or near the second end 116 of the second bar portion 106. The first strap guide slot 130 may open into and extend from the first receiving aperture 120 of the sling attachment portion 110 to the first upper surface 124 of the first bar portion 104 at an angle to the second longitudinal direction (e.g. at an angle to the +/−X direction of the coordinate axes of FIG. 2) such that an end of the first strap guide slot 130 closest to the hub portion 102 of the sling bar is elevated relative to an end of the first strap guide slot 130 opening into the first receiving aperture 120. More specifically, the first strap guide slot 130 may be angled upward (e.g. in the +Y direction of the coordinate axes of FIG. 2) relative to the bottom of the first receiving aperture 120. This orientation allows gravity to assist the movement of a sling loop (e.g., sling loop 140 depicted in phantom in FIG. 2) into the first receiving aperture 120 when the sling sloop 140 is positioned in the first strap guide slot 130 and may assist in preventing the movement of a sling loop 140 out of the first receiving aperture 120. This may be beneficial in some applications as it may make it more difficult for a sling loop 140 disposed within the first receiving aperture 120 to decouple from the sling bar 100 inadvertently.

Similarly, the second strap guide slot 132 may open into and extend from the second receiving aperture 122 of the sling attachment portion 112 to the second upper surface 126 of the second bar portion 106 at an angle to the first longitudinal direction (e.g. at an angle to the +/−X direction of the coordinate axes of FIG. 2) such that an end of the second strap guide slot 132 closest to the hub portion 102 of the sling bar 100 is elevated relative to an end of the second strap guide slot 132 opening into the second receiving aperture 122. More specifically, the second strap guide slot 132 may be angled upward (e.g. in the +Y direction of the coordinate axes of FIG. 2) relative to the bottom of the second receiving aperture 122.

Still referring to FIG. 2, the first strap guide slot 130 may be defined by a first lower slot surface 134 and a first upper slot surface 144, opposite the first lower slot surface 134. The first upper slot surface 144 may be generally positioned above the first lower slot surface 134 (e.g. in the +Y direction of the coordinate axis of FIG. 2). Similarly, the second strap guide slot 132 may be generally defined by a second lower slot surface 136 and a second upper slot surface 146, opposite the second lower slot surface 136. The second upper slot surface 146 may be generally positioned above the second lower slot surface 136 (e.g. in the +Y direction of the coordinate axis of FIG. 2). In embodiments, each of the first strap guide slot 130 and the second strap guide slot 132 may have rounded edges at the transition to the first and second upper surfaces 124, 126 of the first and second bar portions 104, 106. For example, the first strap guide slot 130 may have a first rounded edge 138 between the first upper surface 124 and the first upper slot surface 144. The first strap guide slot 130 may also have a second rounded edge 148 between the first upper surface 124 and the first lower slot surface 134. The second strap guide slot

132 may similarly have such rounded edges. This may be beneficial in some applications as it may limit the number of snag points on the sling bar 100.

The various components of the sling bar 100 including the hub portion 102, the first bar portion 104, the second bar portion 106, the first sling attachment portion 110, and/or the second sling attachment portion 112 may be from a material suitable for load bearing applications, such as materials capable of withstanding the anticipated static and/or dynamic forces on the sling bar 100 without fatigue and/or failure. According to some embodiments, each component may be dimensioned to withstand, alone and/or in combination with other components, the anticipated static and/or dynamic forces. In some aspects, the various components of the sling bar 100 including the hub portion 102, the first bar portion 104, the second bar portion 106, the first sling attachment portion 110, and/or the second sling attachment portion 112 may be formed from cast aluminum, steel, a metal alloy, and/or the like.

Still referring to FIG. 2, the sling bar 100 may further include a first retention spring 150 disposed within the first strap guide slot 130 and a second retention spring 152 disposed within the second strap guide slot 132. As will be described in additional detail herein, the first retention spring 150 may be coupled to the first lower slot surface 134 of the first strap guide slot 130, and the second retention spring 152 may be coupled to the second lower slot surface 136 of the second strap guide slot 132. Each of the first retention spring 150 and the second retention spring 152 may be moveable between a closed position and an open position with the first strap guide slot 130 and the second strap guide slot, respectively.

Figure 3:
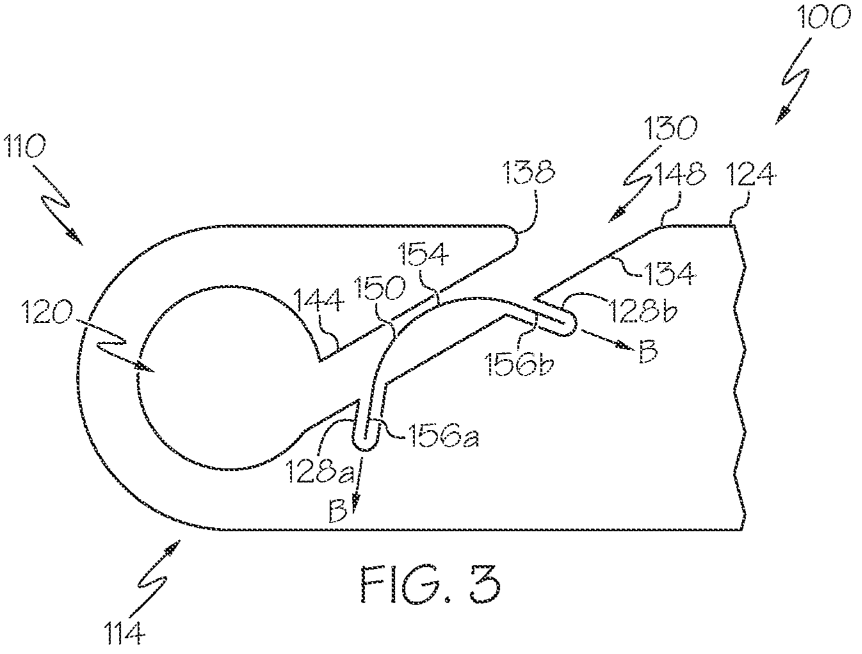
FIG. 3 schematically depicts a front view of a cross section of a first bar portion of the sling bar of FIG. 1, according to one or more embodiments shown and described herein.

Referring now to FIG. 3, FIG. 3 depicts a perspective view of the first retention spring 150 of the sling bar 100 in the closed position. In particular, the first retention spring 150 may have two end portions 156*a* and 156*b* and a center portion 154 extending therebetween. Each of the two end portions 156*a* and 156*b* may be coupled to the first bar portion 104 at the first lower slot surface 134. When in the closed position, the first retention spring 150 may be generally arcuate in shape such that the center portion 154 extends toward the first upper slot surface 144 and is arced above the first lower slot surface 134. In embodiments, the first retention spring 150 may have a bulb shape, as depicted in FIG. 3. Accordingly, at least a portion of the first retention spring 150 may extend into the first strap guide slot 130 such that the first retention spring 150 obstructs at least a portion of the first strap guide slot 130.

Still referring to FIG. 3, in some embodiments, the two end portions 156*a* and 156*b* of the first retention spring 150 may be retained within receiving channels 128*a* and 128*b* of the first bar portion 104. Each of the receiving channels 128*a* and 128*b* may be disposed within the first lower slot surface 134 at an angle to the first lower slot surface 134 (e.g. in a channel direction B). One or both of the end portions 156*a* and 156*b* may be slideably retained within the receiving channels 128*a* and 128*b* such that one or both of the end portions 156*a* and 156*b* are moveable within the receiving channels 128*a* and 128*b* along the channel direction B. For example, in some embodiments, one end portion (for example, the end portion 156*a*) may be fixed within embedded receiving channel (for example, the receiving channel 128*a*) while the other end portion (for example, the end portion 156*b*) may be slidable within the receiving channel (for example, the receiving channel 128*b*). In other embodiments, both end portions 156*a* and 156*b* may be slidable within the respective receiving channels 128*a*, 128*b*.

Accordingly, it should be understood that one or both of the end portions 156*a* and 156*b* of the first retention spring 150 may slide further into the receiving channels 128*a* and 128*b* (e.g. in the channel direction B) when the first retention spring 150 is moved from the closed position to the open position. As this movement occurs, the center portion 154 of the first retention spring 150 will be retracted toward the first lower slot surface 134. Accordingly, when the first retention spring 150 is moved from the closed position to the open position, the center portion 154 of the first retention spring 150 will not extend as far into the first strap guide slot 130, and the first strap guide slot 130 may be substantially open compared to when the first retention spring 150 is in the closed position. It is noted that, in embodiments, the first retention spring 150 may not lay flat against the first lower slot surface 134 when in the open position. Instead, the first retention spring 150 may retract a sufficient amount to allow a sling loop (e.g., sling loop 140 depicted in phantom in FIG. 2) to pass through the first strap guide slot 130 and over the first retention spring 150.

Referring back to FIG. 2, the second retention spring 152 may be coupled to the second lower slot surface 136 of the second strap guide slot 132 in a similar manner as described herein with respect to the first retention spring 150. Accordingly, the second retention spring 152 may be similarly moveable between an open position and a closed position. When in the closed position, the second retention spring 152 may extend into the second strap guide slot 132 such that the second retention spring 152 obstructs at least a portion of the second strap guide slot 132. When in the open position, the second retention spring 152 may retract toward the second lower slot surface 136 such that the second strap guide slot 132 is substantially open.

Referring collectively to FIGS. 2 and 3, the first retention spring 150 and the second retention spring 152 are biased to the closed position thereby at least partially obstructing the first strap guide slot 130 and the second strap guide slot 132, respectively. As such, the first retention spring 150 and the second retention spring 152 need to be acted on with a threshold opening force to move the first retention spring 150 and the second retention spring 152 from the closed position to the open position and thereby open the first strap guide slot 130 and the second strap guide slot 132, respectively. The required threshold opening force may be beneficial as it may make it more difficult for a sling loop (e.g., sling loop 140 depicted in phantom in FIG. 2) disposed within the first receiving aperture 120 or the second receiving aperture 122 to decouple from the sling bar 100 inadvertently.

In some embodiments, the threshold opening force required to move the first retention spring 150 or the second retention spring 152 from the closed position to the open position may be less than or equal to a body weight of a subject supported by the sling bar 100. In some embodiments, the threshold opening force may be less than or equal to a maximum rated load of the lift system 200. For example, the threshold opening force may be less than 100 lbf, 200 lbf, 300 lbf., or 400 lbf. Accordingly, a user, such as a caregiver, may relatively easily position a sling loop (e.g., sling loop 140 depicted in phantom in FIG. 2) of a sling supporting a subject, through the first strap guide slot 130 or the second strap guide slot 132 and into the first receiving aperture 120 or the second receiving aperture 122 by allowing the weight supported by the sling bar 100 to apply the threshold opening force required to move the first retention spring 150 or the second retention spring 152 from the closed position to the open position. In the embodiments described herein, a user may position a sling loop through the first strap guide slot 130 or the second strap guide slot 132 and into the first receiving aperture 120 or the second receiving aperture 122 without needing the use of both hands.

In some embodiments, the first retention spring 150 and the second retention spring 152 may be biased toward the closed positioned with a spring force, such as when the first retention spring 150 and the second retention spring 152 are single leaf springs. Accordingly, the threshold opening force may be a predetermined value characterized by the spring force of each of the first retention spring 150 and the second retention spring 152. In embodiments, the spring force may be provided by the material of the first retention spring 150 and the second retention spring 152. The first retention spring 150 and the second retention spring 152 may be constructed from a material configured to resist deformation upon movement between the closed position and the open position. In particular, the first retention spring 150 and the second retention spring 152 may be constructed from a material such as spring steel, copper-based spring alloys, nickel-based spring alloys, and the like. Accordingly, the spring force may be predetermined by the geometry, material, and loading of the first retention spring 150 and the second retention spring 152.

Referring again to FIG. 2, the first lower slot surface 134 may be positioned gravitationally downward from the first upper slot surface 144 such that a gravitational force of a sling loop (e.g., sling loop 140 depicted in phantom in FIG. 2) of a sling supporting a subject generally opposes the spring force of the first retention spring 150 when the sling loop is disposed within the first strap guide slot 130. Similarly, the second lower slot surface 136 may be positioned gravitationally downward from the second upper slot surface 146. This may be beneficial in some applications as it may allow a user, such as a caregiver, to position a sling loop through the first strap guide slot 130 or the second strap guide slot 132 more easily.

It is noted that, after a first sling loop is positioned through the first strap guide slot 130 and into the first receiving aperture 120 with a first threshold opening force, as described above, an additional sling loop may be positioned through the second strap guide slot 132 and into the second receiving aperture 122 with a second threshold opening force. Accordingly, the sling bar 100 may support one or more sling loops associated with a sling in each of the first receiving aperture 120 and the second receiving aperture 122 concurrently.

Additional embodiments of sling bars 100 will now be described herein. While the embodiments are described with reference to the first strap guide slot 130 of the first bar portion 104, it is to be understood that the embodiments apply equally to the second strap guide slot 132 of the second bar portion 106.

Figure 4:
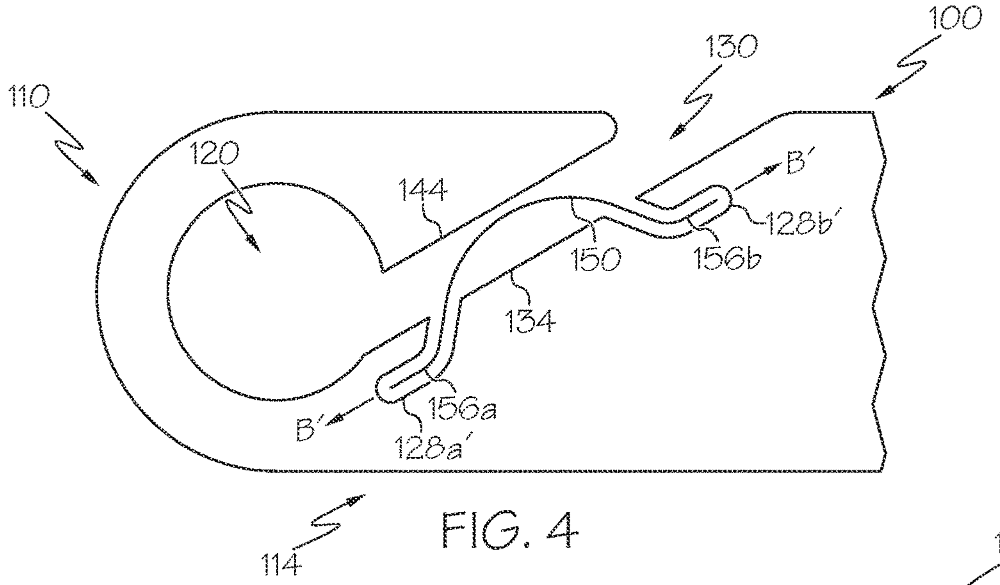
FIG. 4 schematically depicts a front view of a cross section of a first bar portion of a sling bar, according to one or more embodiments shown and described herein.

Referring now to FIG. 4, in some embodiments, the first strap guide slot 130 may have receiving channels **128*a*' and 128*b*' that are formed at a shallow angle with respect to the first lower slot surface 134. Accordingly, the receiving channels 128*a*' and 128*b*' may have a channel direction B' that is relatively shallow. For example, the channel direction B' may be parallel or nearly parallel with the first lower slot surface 134, such as depicted in FIG. 4. This may be beneficial in some applications as it may decrease the risk of the first retention spring 150 becoming uncoupled from the first lower slot surface 134**.

Figure 5:
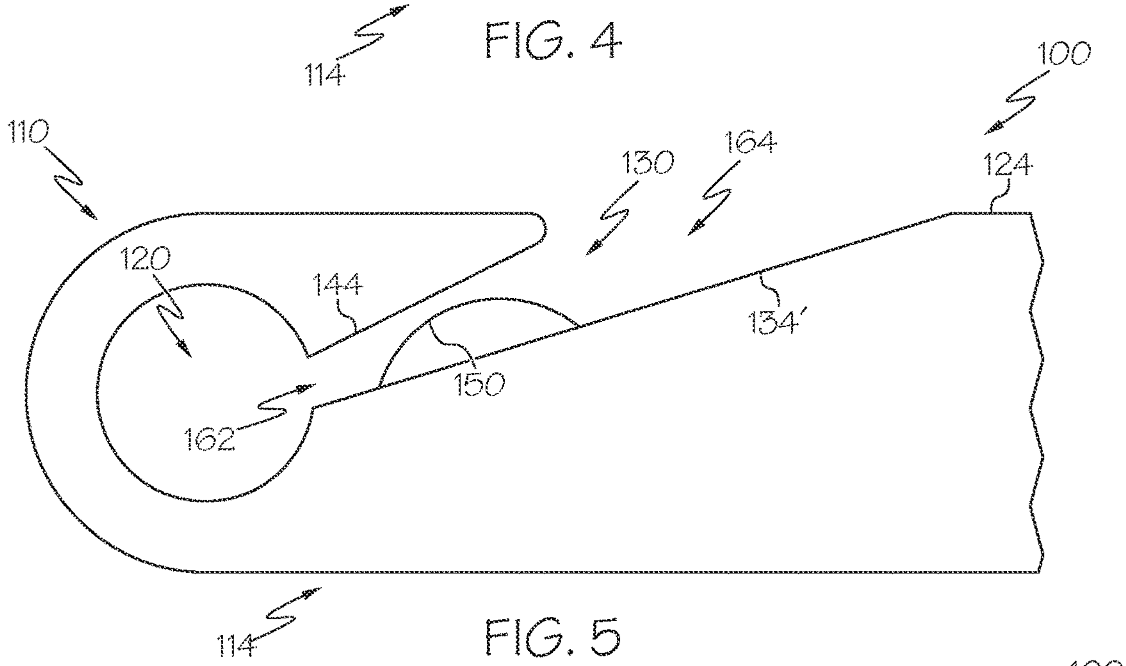
FIG. 5 schematically depicts a front view of a cross section of a first bar portion of a sling bar, according to one or more embodiments shown and described herein.

Referring now to FIG. 5, in some embodiments, sling bar 100 may have a first lower slot surface 134' that is oriented at a different angle than the first upper slot surface 144. Accordingly, the first strap guide slot 130, may have a top opening 164 that is larger than the bottom opening 162. That is, the first strap guide slot 130 may taper from the upper surface 124 of the first bar portion 104 to the first receiving aperture 120 of the first sling attachment portion 110. This may make it easier to insert a sling loop (e.g., sling loop 140 depicted in phantom in FIG. 2), into the first receiving aperture 120 through the first strap guide slot 130 than it is to remove the sling loop from the first receiving aperture 120. This may be beneficial in some applications as it decreases the risk of unintended decoupling of the sling hook from the first receiving aperture 120 while increasing the ease of use.

Figure 6:
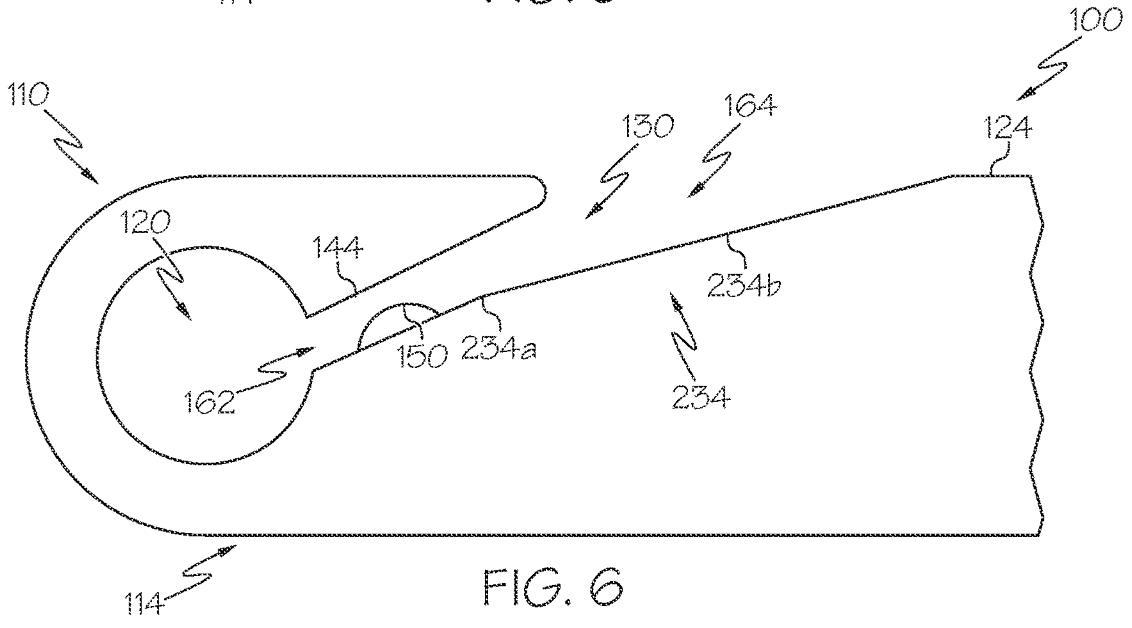
FIG. 6 schematically depicts a front view of a cross section of a first bar portion of a sling bar, according to one or more embodiments shown and described herein.

Referring now to FIG. 6, in some embodiments, the first strap guide slot 130 of the sling bar 100 may have a first lower slot surface 234 that has a first portion **234*a* and a second portion 234*b*. The first portion 234*a* may extend from the first receiving aperture 120 to the second portion 234*b*. Accordingly, the first portion 234*a* may form the bottom opening 162 of the first strap guide slot 130 at the first receiving aperture 120. The second portion 234*b* may extend from the first portion 234*a* to the first upper surface 124 of the first bar portion 104. Accordingly, the second portion 234*b* may form the top opening 164 of the first strap guide slot 130. In this embodiment, the second portion 234*b* may be oriented at an angle to the first portion 234*a*. In embodiments, the second portion 234*b* may be oriented at an angle with respect to the first portion 234*a* such that the second portion 234*b* is more horizontal than the first portion 234*a* (e.g. the second portion 234*b* is closer to parallel with the X axis of the coordinate axes of FIG. 2 than the first portion 234*a*). Because of this orientation, the top opening 164 may be larger than the bottom opening 162, similar to the embodiment depicted in FIG. 4. That is, the first strap guide slot 130 may taper from the upper surface 124 of the first bar portion 104 to the first receiving aperture 120 of the first sling attachment portion 110. This may make it easier to insert a sling loop (e.g., sling loop 140 depicted in phantom in FIG. 2), into the first receiving aperture 120 through the first strap guide slot 130 than it is to remove the sling loop from the first receiving aperture 120. This may be beneficial in some applications as it decreases the risk of unintended decoupling of the sling hook from the first receiving aperture 120 while increasing the ease of use. It is noted that while the orientation of the first portion 234*a* is depicted as substantially parallel to the first upper slot surface 144**, other orientations are contemplated and possible.

Figure 7:
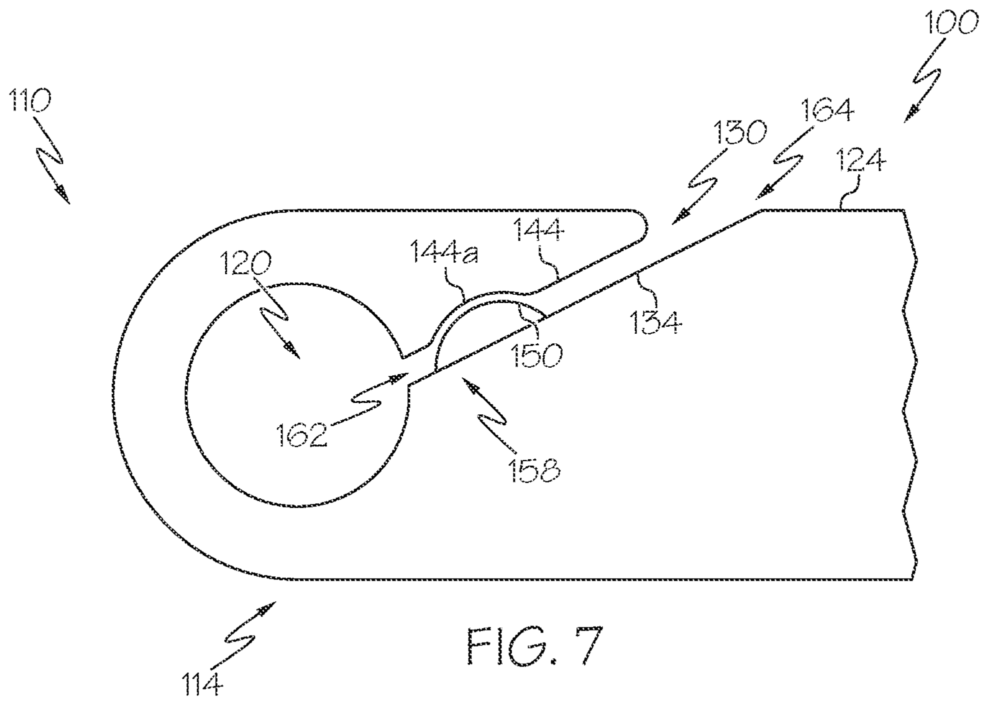
FIG. 7 schematically depicts a front view of a cross section of a first bar portion of a sling bar, according to one or more embodiments shown and described herein.

Referring now to FIG. 7, in some embodiments, the first strap guide slot 130 of the sling bar 100 may have a middle portion **144*a* that is wider than the bottom opening 162 and the top opening 164. This may be beneficial in some applications as it may provide sufficient space within the first strap guide slot 130 for the first retention spring 150 while maintaining a bottom opening 162 that is relatively small to prevent inadvertent removal of a sling loop from the first receiving aperture 120. As depicted in FIG. 7, the middle portion 144*a* that is wider than the top opening 164 and the bottom opening 162 may be achieved with a bowed recess formed in the first upper slot surface 144. As depicted, the bowed section in the middle portion 144*a* of the first upper slot surface 144 follows the curvature of the middle portion 158 first retention spring 150**. However, other geometries are contemplated and possible.

Figure 8:
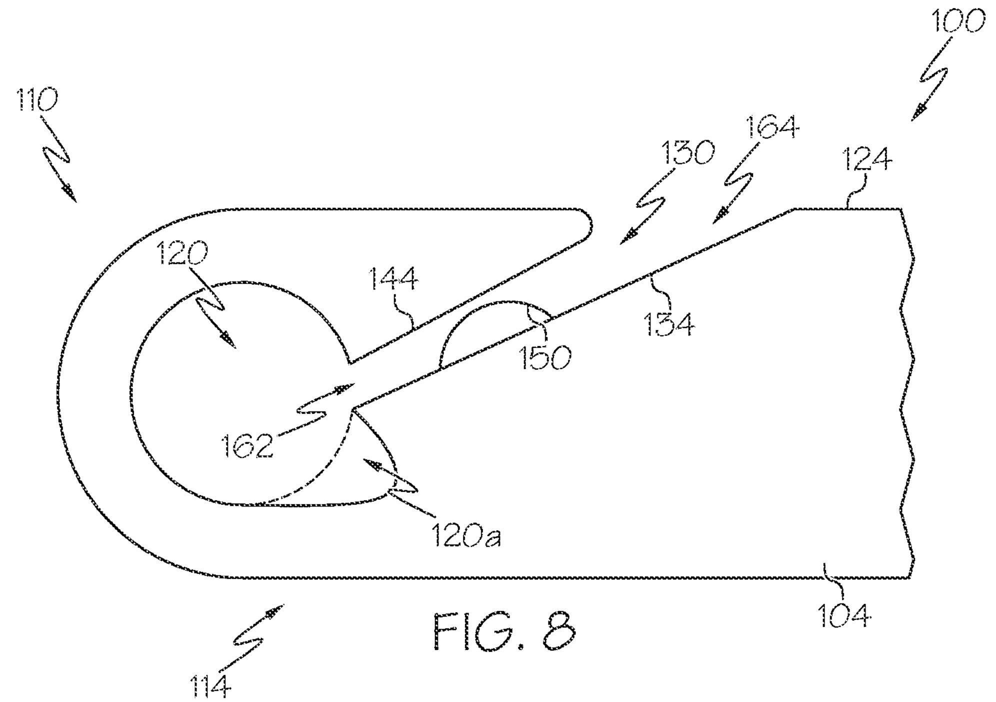
FIG. 8 schematically depicts a front view of a cross section of a first bar portion of a sling bar, according to one or more embodiments shown and described herein.

Referring now to FIG. 8, in some embodiments, the first receiving aperture 120 may further comprise an undercut pocket **120*a*. The undercut pocket 120*a* may extend into the first end 114 of the first bar portion 104. In embodiments, the undercut pocket 120***a* may extend past the bottom opening 162 of the first strap guide slot 130 (e.g. further in the +X direction of the coordinate axes of FIG. 2). Accordingly, a sling loop (e.g., sling loop 140 depicted in phantom in FIG. 2) disposed within the first receiving aperture 120 may be more likely to move into the undercut pocket 120*a* than into the first strap guide slot 130 upon inadvertent movement of the sling loop, such as when the sling bar 100 is shifted from an orientation other than horizontal. This may be beneficial in some application as it may decrease the risk of inadvertent decoupling of the sling loop from the sling bar 100.

Again, it is noted that the above embodiments described with respect to FIGS. 4-8 apply equally to the second bar portion 106. For example, in some embodiments the second strap guide slot 132 may have second lower slot surface 136 that is oriented at an angle to the second upper slot surface 146, such as described above. As another example, in some embodiments, the second receiving aperture may 122 may have an undercut pocket such as the undercut pocket 120*a* described above.

In view of the above, it should now be understood that at least some embodiments of the present disclosure are directed to an illustrative sling bar for use in a subject lift system. In general, the sling bar may include a first bar portion that extends in a first longitudinal direction. The first bar portion may include a first upper surface, a first receiving aperture, a first strap guide slot, and a first retention spring. The first receiving aperture may be disposed within the first bar portion. The first strap guide slot may be disposed within the first bar portion and may extend from the first upper surface to the first receiving aperture. The first strap guide slot may be defined by a first lower slot surface and a first upper slot surface. The first retention spring may be disposed within the first strap guide slot and moveable between a closed position and an open position. The first retention spring may be extended toward the first upper slot surface when in the closed position and may be retracted toward the first lower slot surface when in the open position. The first retention spring may be biased to the closed position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A sling bar, comprising:

a top surface that connects to an attachment mechanism of a lift system, wherein the attachment mechanism is positioned toward a first vertical direction with respect to the top surface;

a first bar portion that extends in a first longitudinal direction, the first bar portion having a first upper surface extending from the top surface;

a first receiving aperture disposed within the first bar portion;

a first strap guide slot disposed within the first bar portion and extending from the first upper surface to the first receiving aperture, the first strap guide slot defined by a first lower slot surface and a first upper slot surface; and a first retention spring, disposed within the first strap guide slot and moveable between a closed position and an open position, wherein:

the first retention spring is extended toward the first vertical direction and toward the first upper slot surface when in the closed position and is retracted away from the first vertical direction and toward the first lower slot surface when in the open position; and the first retention spring is biased to the closed position.

2. The sling bar of claim 1, wherein the first retention spring comprises a first end, a second end, and a middle portion extending between the first end and the second end, wherein the first end and the second end are each disposed within the first lower slot surface and the middle portion comprises an arcuate shape extending into the first strap guide slot.

3. The sling bar of claim 2, wherein the first lower slot surface comprises a first receiving channel, wherein the first end of the first retention spring is disposed within the first receiving channel.

4. The sling bar of claim 3, wherein:

the first end of the first retention spring is slidable within the first receiving channel; and sliding the first end of the first retention spring within the first receiving channel moves the first retention spring between the open position and the closed position of the first retention spring.

5. The sling bar of claim 3 wherein the first receiving channel is oriented at an angle to the first lower slot surface.

6. The sling bar of claim 3, wherein the first receiving channel is oriented substantially parallel to the first lower slot surface.

7. The sling bar of claim 1, wherein the first retention spring is a single leaf spring.

8. The sling bar of claim 1, wherein the first strap guide slot has a top opening and a bottom opening, wherein the top opening is larger than the bottom opening.

9. The sling bar of claim 1, wherein at least a portion of the first lower slot surface is oriented at an angle to at least a portion of the first upper slot surface.

10. The sling bar of claim 1, wherein the first retention spring has a bulb shape.

11. The sling bar of claim 1, wherein:

the first strap guide slot has a top opening disposed at the first upper surface, a bottom opening disposed at the first receiving aperture, and a middle portion disposed between the top opening and the bottom opening; and the middle portion is wider than the top opening and the bottom opening.

12. The sling bar of claim 1, wherein the first receiving aperture defines an undercut pocket.

13. The sling bar of claim 1, further comprising:

a second bar portion that extends in a second longitudinal direction, the second bar portion having a second upper surface;

a second receiving aperture disposed within the second bar portion;

a second strap guide slot disposed within the second bar portion and extending from the second upper surface to the second receiving aperture, the second strap guide slot defined by a second lower slot surface and a second upper slot surface; and a second retention spring disposed within the second strap guide slot, the second retention spring moveable between a closed position of the second retention spring and an open position of the second retention spring, wherein the second retention spring is extended toward the second upper slot surface when in the closed position and is retracted toward the second lower slot surface when in the open position; and the second retention spring is biased toward the closed position of the second retention spring.

14. A lift system comprising:

a subject lift including a sling bar, the sling bar comprising:

a top surface that connects to an attachment mechanism, wherein the attachment mechanism is positioned toward a first vertical direction with respect to the top surface;

a first bar portion that extends in a first longitudinal direction, the first bar portion having a first upper surface extending from the top surface;

a first receiving aperture disposed within the first bar portion;

a first strap guide slot disposed within the first bar portion and extending from the first upper surface to the first receiving aperture, the first strap guide slot defined by a first lower slot surface and a first upper slot surface; and a first retention spring, disposed within the first strap guide slot and moveable between a closed position and an open position, wherein:

the first retention spring is extended toward the first vertical direction and toward the first upper slot surface when in the closed position and is retracted away from the first vertical direction and toward the first lower slot surface when in the open position; and the first retention spring is biased to the closed position.

15. The sling bar of claim 14, wherein the first strap guide slot has a top opening and a bottom opening, wherein the top opening is larger than the bottom opening.

16. The sling bar of claim 14, wherein at least a portion of the first lower slot surface is oriented at an angle to at least a portion of the first upper slot surface.

17. The sling bar of claim 14, wherein the first lower slot surface has a first portion and a second portion oriented at an angle to the first portion.

18. The lift system of claim 14, wherein the sling bar further comprises:

a second bar portion that extends in a second longitudinal direction, the second bar portion having a second upper surface;

a second receiving aperture disposed within the second bar portion;

a second strap guide slot disposed within the second bar portion and extending from the second upper surface to the second receiving aperture, the second strap guide slot defined by a second lower slot surface and a second upper slot surface; and a second retention spring disposed within the second strap guide slot, the second retention spring moveable between a closed position of the second retention spring and an open position of the second retention spring, wherein the second retention spring is extended toward the second upper slot surface when in the closed position and is retracted toward the second lower slot surface when in the open position; and the second retention spring is biased toward the closed position of the second retention spring.

19. A method of attaching a subject sling to a sling bar, the method comprising:

connecting a top surface of the sling bar to an attachment mechanism of a lift system, wherein the attachment mechanism is positioned toward a first vertical direction with respect to the top surface;

positioning a sling loop associated with the subject sling into a first strap guide slot on the sling bar, wherein the first strap guide slot extends from a first upper surface to a first receiving aperture, the first strap guide slot defined by a first lower slot surface and a first upper slot surface;

applying a first threshold opening force via the sling loop to a first retention spring disposed within the first strap guide slot, thereby moving the first retention spring from a closed position of the first retention spring to an open position of the first retention spring, wherein the first retention spring is moveable between the closed position of the first retention spring and the open position of the first retention spring, the first retention spring is extended toward the first vertical direction and toward the first upper slot surface when in the closed position and is retracted away from the first vertical direction and toward the first lower slot surface when in the open position, and is biased toward the closed position of the first retention spring by a first spring force; and positioning the sling loop in the first receiving aperture disposed within the sling bar and adjoining the first strap guide slot.

20. The method of claim 19, further comprising:

positioning an additional sling loop into a second strap guide slot on the sling bar;

applying a second threshold force via the additional sling loop to a second retention spring disposed within the second strap guide slot, thereby moving the second retention spring from a closed position of the second retention spring to an open position of the second retention spring, wherein the second retention spring is moveable between the closed position of the second retention spring and the open position of the second retention spring and is biased toward the closed position of the second retention spring with a second spring force; and positioning the additional sling loop into a second receiving aperture disposed within the sling bar and adjoining the second strap guide slot.

* * * * *